US011483621B2

(12) United States Patent
Lu et al.

(10) Patent No.: US 11,483,621 B2
(45) Date of Patent: Oct. 25, 2022

(54) BIG DATA ACQUISITION AND ANALYSIS SYSTEM USING INTELLIGENT IMAGE RECOGNITION, AND APPLICATION METHOD THEREOF

(71) Applicant: Shanghai Illuminera Digital Technology Co., Ltd., Shanghai (CN)

(72) Inventors: Yun Lu, Shanghai (CN); Chenghao Wu, Shanghai (CN)

(73) Assignee: SHANGHAI ILLUMINERA DIGITAL TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/294,105

(22) PCT Filed: Jul. 17, 2020

(86) PCT No.: PCT/CN2020/102654
§ 371 (c)(1),
(2) Date: May 14, 2021

(87) PCT Pub. No.: WO2021/057213
PCT Pub. Date: Apr. 1, 2021

(65) Prior Publication Data
US 2022/0030310 A1    Jan. 27, 2022

(30) Foreign Application Priority Data
Sep. 23, 2019 (CN) .......................... 201910898216.7

(51) Int. Cl.
*H04N 21/466* (2011.01)
*H04N 21/45* (2011.01)
(52) U.S. Cl.
CPC ..... *H04N 21/4665* (2013.01); *H04N 21/4532* (2013.01); *H04N 21/4667* (2013.01)

(58) Field of Classification Search
None
See application file for complete search history.

(56) References Cited

U.S. PATENT DOCUMENTS

| 9,135,712 | B2* | 9/2015 | Garcia Morato Fernandez Baillo ................ G06F 16/583 |
| 10,275,488 | B1* | 4/2019 | Lu ........................ G06F 17/18 |

(Continued)

FOREIGN PATENT DOCUMENTS

| CN | 109271554 A | 1/2019 |
| CN | 110062208 A | 7/2019 |

(Continued)

OTHER PUBLICATIONS

PCT/CN2020/102654, International Search Report (Chinese Language only), 10 pages.

(Continued)

*Primary Examiner* — Alexander Q Huerta
(74) *Attorney, Agent, or Firm* — Faegre Drinker Biddle & Reath LLP

(57) ABSTRACT

Big data acquisition and analysis system using intelligent image recognition, and application method thereof are provided. The system includes an intelligent cloud server, wherein the intelligent cloud server includes a computation server and a storage server, the computation server is equipped with an image recognition system which includes a data reading module, a video stream data processing module, an AI image recognition module, a data storage module and a model tuning module, and the storage server is provided with a video stream storage database, a video stream management module and a data center database that are interactively connected. In embodiments of the present disclosure, consumers' non-private actual digital behaviors are restored to produce more commercial value. This process realizes real-time digital behavior analysis of consumers, (Continued)

enables business analysis to be closer to reality, brings more valuable analysis results to brands, and guides the brands to optimize consumption paths globally.

11 Claims, 3 Drawing Sheets

(56) References Cited

U.S. PATENT DOCUMENTS

| | | | |
|---|---|---|---|
| 2009/0123025 | A1 | 5/2009 | Deng et al. |
| 2012/0039539 | A1* | 2/2012 | Boiman ............... G11B 27/34 382/224 |
| 2014/0037203 | A1 | 2/2014 | Garcia et al. |
| 2016/0004914 | A1 | 1/2016 | Park |
| 2017/0289617 | A1 | 10/2017 | Song et al. |
| 2017/0372165 | A1 | 12/2017 | Jouhikainen et al. |
| 2019/0122121 | A1* | 4/2019 | Yu ..................... A61K 47/545 |
| 2021/0201165 | A1* | 7/2021 | Pedersen ................ G06N 3/02 |
| 2021/0352371 | A1* | 11/2021 | Ortiz ................. G06N 3/0445 |
| 2022/0121884 | A1* | 4/2022 | Zadeh .................. G06N 3/006 |

FOREIGN PATENT DOCUMENTS

| | | |
|---|---|---|
| CN | 110163154 A | 8/2019 |
| CN | 110826398 A | 2/2020 |

OTHER PUBLICATIONS

European Patent Office; Extended European Search Report; European Application No. 20867413.5; dated Jun. 22, 2022; 10 pages.

\* cited by examiner

BIG DATA ACQUISITION AND ANALYSIS SYSTEM USING INTELLIGENT IMAGE RECOGNITION, AND APPLICATION METHOD THEREOF

CROSS-REFERENCE TO RELATED APPLICATIONS

This application is the national phase of International Application No. PCT/CN2020/102654, filed on Jul. 17, 2020, which claims the benefit of priority to Chinese Patent Application No. 201910898216.7, filed on Sep. 23, 2019, and entitled "BIG DATA ACQUISITION AND ANALYSIS SYSTEM USING INTELLIGENT IMAGE RECOGNITION, AND APPLICATION METHOD THEREOF", the entire disclosure of which is incorporated herein by reference.

TECHNICAL FIELD

The present disclosure generally relates to data intelligent analysis field, and more particularly, to a big data acquisition and analysis system using intelligent image recognition, and an application method thereof.

BACKGROUND

With the development of society, acquisition, analysis, regulation and use of user digital behavior data can generate commercial value, and thus have great application prospects. When conducting commercial marketing of products or services, companies need to master presentation of competitors' products or services of similar categories and presentation of their own products or services, including specific digital behavior data such as brands, products or advertisements, for market researchers to analyze. On terminals where user digital behavior data is generated, including mobile phones, tablets, computers, smart TVs, etc., if generated video stream data requires user digital behavior data acquisition, an existing operation is manual data processing. Specifically, researchers deliver videos to be researched 3 that requires data acquisition. Based on manual search and annotation, specific digital behavior data including brands, products, advertisements, etc. in the videos are selected one by one to form a list. This operation easily results in data omissions, large errors, slow manual operation and high cost. Besides, quality of manual digital behavior data acquisition and analysis is uneven and cannot be accurately controlled. Compared with manual data acquisition and analysis, using computers to analyze data that brands and consumers care about and to perform modular analysis may have advantages such as fast speed, high efficiency, precision and no omission, which cannot be achieved by manual operations. Therefore, it is of great significance to provide a big data acquisition and analysis system using intelligent image recognition, and an application method thereof in response to the above problems.

SUMMARY

Embodiments of the present disclosure may provide a big data acquisition and analysis system using intelligent image recognition, and an application method thereof. Digital behaviors are converted into video streams and then transmitted to an intelligent cloud server for frame-by-frame disassembly and analysis, and image data of the video streams is recognized in an Artificial Intelligence (AI) intelligent manner to generate an analysis result for application. During this process, the intelligent cloud server performs management, storage and processing of the video streams, and compares processed image data with trained models including but not limited to brand classifier models, advertisement classifier models and product classifier models in a distributed manner, so as to restore consumers' non-private and real digital behaviors to produce more commercial values, which possesses advantages such as no delay, no omission, high speed, few errors and low cost, realizes real-time digital behavior analysis of consumers, enables business analysis to be closer to reality, brings more valuable analysis results to brands, and guides the brands to optimize consumption paths globally.

In an embodiment of the present disclosure, a big data acquisition and analysis system using intelligent image recognition which includes an intelligent cloud server is provided, wherein the intelligent cloud server includes a computation server and a storage server that are interactively connected, the computation server is equipped with an image recognition system which includes a data reading module, a video stream data processing module, an AI image recognition module, a data storage module and a model tuning module that are sequentially connected, the storage server is provided with a video stream storage database, a video stream management module and a data center database that are interactively connected, and the data reading module is interactively connected with the video stream storage database; the intelligent cloud server is configured to receive, through a communication network and Hyper Text Transfer Protocol(s) (HTTP(s)), big data acquired by a video stream acquisition terminal and transmitted as video stream data, and store the big data in the video stream storage database, wherein the big data includes pictures, live videos or ordinary videos; the video stream storage database is configured to store the acquired video stream data, the data center database is configured to store device information on the video stream acquisition terminal, and match the acquired video stream data with the video stream acquisition terminal, and the video stream management module is configured to manage upload, deletion and a read order of the video stream data; the data reading module is configured to sequentially read arranged video stream data in the video stream storage database, the video stream data processing module is configured to filter and process the video stream data into image data capable of being recognized by the AI image recognition module, the AI image recognition module is configured to perform AI intelligent image recognition on the image data processed by the video stream data processing module, and compare the recognized image data with an image recognition classifier model stored in the data storage module to obtain a recognition result, and the model tuning module is configured to perform recognition model tuning on the AI image recognition module by continuing training classifier models and classification samples, in response to recall and correctness of the AI image recognition module, to make recognition more accurate and detailed.

Optionally, the communication network includes 4G, 5G or WIFI.

Optionally, the video stream acquisition terminal is configured to record a digital behavior of a user's operation and form the video stream data, and includes a computer, a smart phone, a tablet or a smart TV.

Optionally, the data center database includes a device video stream storage path data table, a user configuration data table and a device status data table; the device video stream storage path data table is configured to establish and allocate a storage path between the acquired video stream data and partitions of the video stream storage database; the user configuration data table is configured to obtain and store configuration parameter data information of a User Equipment (UE) that transmits the video stream data; and the device status data table is configured to obtain and store device status data information of the UE that transmits the video stream data, wherein the device status data information includes running, interrupted and terminated.

Optionally, the data storage module is provided with an advertising classifier model, a brand classifier model and a product classifier model.

In an embodiment of the present disclosure, an application method of the above big data acquisition and analysis system is provided, including: S01, acquiring video stream data, wherein the video stream acquisition terminal acquires the non-private secure video stream data generated by a user in a process of using the video stream acquisition terminal through screen recording; S02, transmitting and storing the video stream data, wherein the video stream data is transmitted to the video stream storage database in the intelligent cloud server for storage through the communication network, the video stream acquisition terminal and a corresponding storage path in the video stream storage database are matched, and configuration data and device status data of the video stream acquisition terminal are stored and recorded; S03, the intelligent cloud server reading data, wherein the video stream data sorted in the video stream storage database is read and transmitted by the data reading module to the video stream data processing module for processing; S04, the intelligent cloud server processing the video stream data read by the data reading module, wherein the processing includes two following modes: disassembling key frames of the acquired video stream data frame by frame, performing differential analysis and comparison on continuous time sequence images obtained after the disassembly, selecting and stitching the key frames to be recognized, and transmitting the key frames to be recognized to the AI image recognition module for image recognition, or, extracting unique physical features from the acquired video stream data, performing differential analysis and comparison on the unique physical features with a detection model in the storage server, selecting useful video stream data based on the differential analysis and comparison, disassembling key frames of the useful video stream data frame by frame, selecting and stitching the key frames to be recognized, and transmitting the key frames to be recognized to the AI image recognition module for image recognition, wherein the intelligent cloud server automatically allocates a processing mode based on a size of the acquired video data stream; S05: performing AI recognition on the video stream data processed by the intelligent cloud server to obtain recognized image data, wherein distributed recognition is performed based on a pre-trained advertising classifier, brand classifier or product classifier; if the recognition succeeds, feeding back a corresponding parameter result and a corresponding type to the intelligent cloud server; or if the recognition fails, discarding the video stream data; S06: classifying and storing the recognized image data, wherein the corresponding parameter result and the corresponding type are reclassified to obtain complete consumer behavior and contact data to be stored in the storage server; and S07: tuning the AI image recognition model, which includes continuing adding samples and tests to tune the AI image recognition model in response to recall and accuracy of the AI image recognition module.

Optionally, the physical features in S04 include color features, video texture features or video motion features of the video stream data.

Embodiments of the present disclosure may provide following advantages.

In embodiments of the present disclosure, digital behaviors are converted into video streams and then transmitted to an intelligent cloud server for frame-by-frame disassembly and analysis, and image data of the video streams is recognized in an AI intelligent manner to generate an analysis result for application. During this process, the intelligent cloud server performs management, storage and processing of the video streams, and compares processed image data with trained models including but not limited to brand classifier models, advertisement classifier models and product classifier models in a distributed manner, so as to restore consumers' non-private and real digital behaviors to produce more commercial values, which possesses advantages such as no delay, no omission, high speed, few errors and low cost, realizes real-time digital behavior analysis of consumers, enables business analysis to be closer to reality, brings more valuable analysis results to brands, and guides the brands to optimize consumption paths globally.

Any product implementing embodiments of the present disclosure does not necessarily need to achieve all the advantages described above.

DETAILED DESCRIPTION

Figure 1:
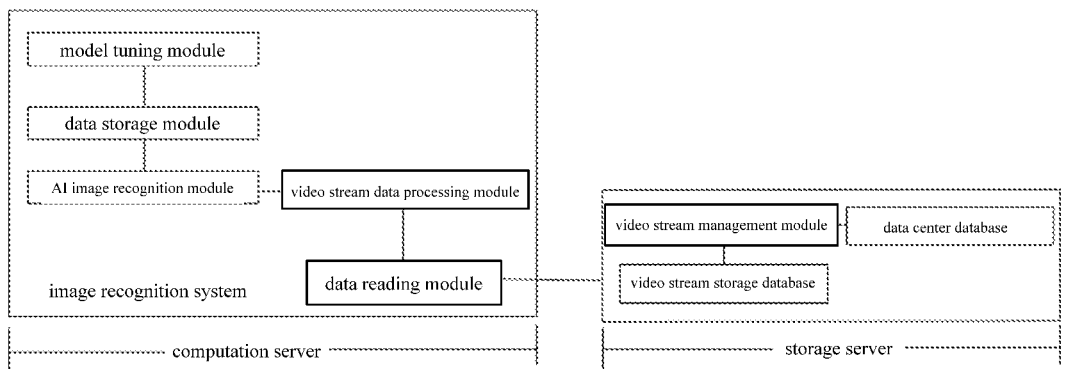
FIG. 1 is a diagram illustrating a connection and a structure of a computation server and a storage server of a big data acquisition and analysis system using intelligent image recognition according to an embodiment.
Figure 2:
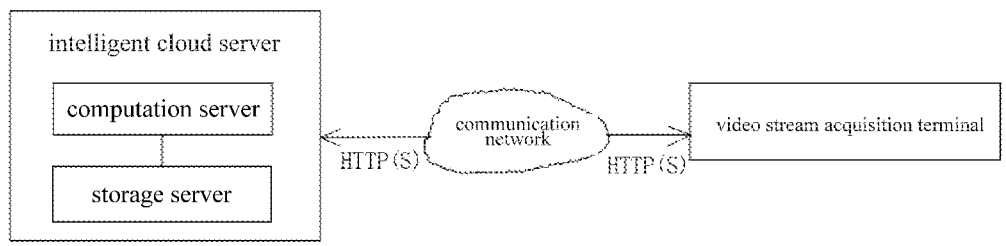
FIG. 2 is a structural diagram of hardware connection according to an embodiment.
Figure 3:
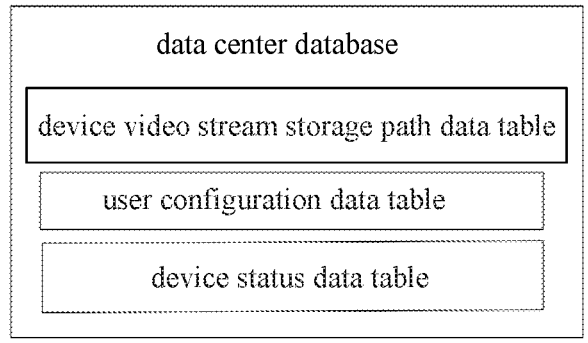
FIG. 3 is a structural diagram of a data center database in FIG. 1.
Figure 4:
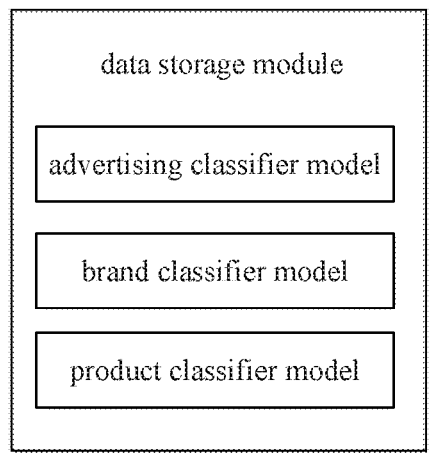
FIG. 4 is a structural diagram of a data storage module in FIG. 1.

Technical solutions in the embodiments of the present disclosure are clearly and completely described below in conjunction with accompanying drawings in the embodiments of the present disclosure. Obviously, the described embodiments are merely a portion of the embodiments of the present disclosure rather than all the embodiments. Based on the embodiments of the present disclosure, all other embodiments obtained by those of ordinary skill in the art without creative work shall fall within the scope of the present disclosure.

Referring to FIGS. 1 to 4, in an embodiment, a big data acquisition and analysis system using intelligent image recognition which includes an intelligent cloud server is provided, wherein the intelligent cloud server includes a computation server and a storage server that are interactively connected, the computation server is equipped with an image recognition system which includes a data reading module, a video stream data processing module, an AI image recognition module, a data storage module and a model tuning module that are sequentially connected, the storage server is provided with a video stream storage database, a video stream management module and a data center database that are interactively connected, and the data reading module is interactively connected with the video stream storage database.

The intelligent cloud server is configured to receive, through a communication network and HTTP(s), big data acquired by a video stream acquisition terminal and transmitted as video stream data, and store the big data in the video stream storage database, wherein the big data includes but is not limited to pictures, live videos or ordinary videos.

The video stream storage database is configured to store the acquired video stream data, the data center database is configured to store device information on the video stream acquisition terminal, and match the acquired video stream data with the video stream acquisition terminal, and the video stream management module is configured to manage upload, deletion and a read order of the video stream data.

The data reading module is configured to sequentially read arranged video stream data in the video stream storage database, the video stream data processing module is configured to filter and process the video stream data into image data capable of being recognized by the AI image recognition module, the AI image recognition module is configured to perform AI intelligent image recognition on the image data processed by the video stream data processing module, and compare the recognized image data with an image recognition classifier model stored in the data storage module to obtain a recognition result, and the model tuning module is configured to perform recognition model tuning on the AI image recognition module by continuing training classifier models and classification samples, in response to recall and correctness of the AI image recognition module, to make recognition more accurate and detailed.

In some embodiments, the communication network includes 4G, 5G or WIFI.

In some embodiments, the video stream acquisition terminal is configured to record a digital behavior of a user's operation and form the video stream data, and includes a computer, a smart phone, a tablet or a smart TV.

In some embodiments, the data center database includes a device video stream storage path data table, a user configuration data table and a device status data table; the device video stream storage path data table is configured to establish and allocate a storage path between the acquired video stream data and partitions of the video stream storage database; the user configuration data table is configured to obtain and store configuration parameter data information of a UE that transmits the video stream data; and the device status data table is configured to obtain and store device status data information of the UE that transmits the video stream data, wherein the device status data information includes running, interrupted and terminated.

In some embodiments, the data storage module is provided with an advertising classifier model, a brand classifier model and a product classifier model.

Figure 5:
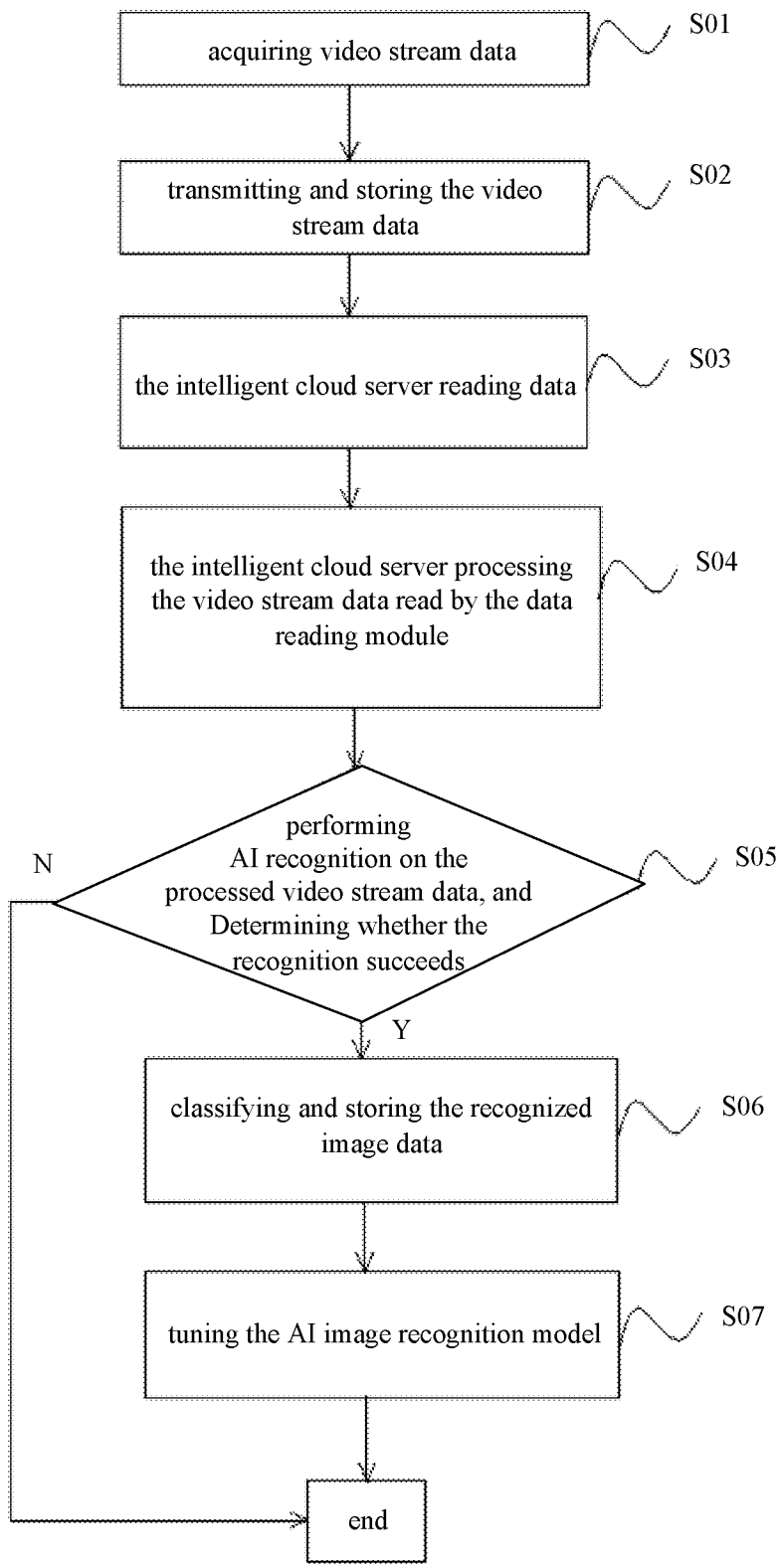
FIG. 5 is a flow chart of an application method of a big data acquisition and analysis system using intelligent image recognition according to an embodiment.

Referring to FIG. 5, in an embodiment, an application method of the above big data acquisition and analysis system is provided, including:

S01, acquiring video stream data, wherein the video stream acquisition terminal acquires the non-private secure video stream data generated by a user in a process of using the video stream acquisition terminal through a way which includes but is not limited to screen recording;

S02, transmitting and storing the video stream data, wherein the video stream data is transmitted to the video stream storage database in the intelligent cloud server for storage through the communication network, the video stream acquisition terminal and a corresponding storage path in the video stream storage database are matched, and configuration data and device status data of the video stream acquisition terminal are stored and recorded;

S03, the intelligent cloud server reading data, wherein the video stream data sorted in the video stream storage database is read and transmitted by the data reading module to the video stream data processing module for processing;

S04, the intelligent cloud server processing the video stream data read by the data reading module, wherein the processing includes two following modes:

disassembling key frames of the acquired video stream data frame by frame, performing differential analysis and comparison on continuous time sequence images obtained after the disassembly, selecting and stitching the key frames to be recognized, and transmitting the key frames to be recognized to the AI image recognition module for image recognition, or extracting unique physical features from the acquired video stream data, performing differential analysis and comparison on the unique physical features with a detection model in the storage server, selecting useful video stream data based on the differential analysis and comparison, disassembling key frames of the useful video stream data frame by frame, selecting and stitching the key frames to be recognized, and transmitting the key frames to be recognized to the AI image recognition module for image recognition, wherein the intelligent cloud server automatically allocates a processing mode based on a size of the acquired video data stream;

S05: performing AI recognition on the video stream data processed by the intelligent cloud server to obtain recognized image data, wherein distributed recognition is performed based on a pre-trained classifier which includes but is not limited to an advertising classifier, a brand classifier or a product classifier; if the recognition succeeds, feeding back a corresponding parameter result and a corresponding type to the intelligent cloud server; or if the recognition fails, discarding the video stream data;

S06: classifying and storing the recognized image data, wherein the corresponding parameter result and the corresponding type are reclassified to obtain complete consumer behavior and contact data to be stored in the storage server; and S07: tuning the AI image recognition model, which includes continuing adding samples and tests to tune the AI image recognition model in response to recall and accuracy of the AI image recognition module.

In some embodiments, the physical features in S04 include color features, video texture features or video motion features of the video stream data.

In embodiments of the present disclosure, digital behaviors are converted into video streams and then transmitted to an intelligent cloud server for frame-by-frame disassembly and analysis, and image data of the video streams is recognized in an AI intelligent manner to generate an analysis result for application. During this process, the intelligent cloud server performs management, storage and processing of the video streams, and compares processed image data with trained models including but not limited to brand classifier models, advertisement classifier models and product classifier models in a distributed manner, so as to restore consumers' non-private and real digital behaviors to produce more commercial values, which possesses advantages such as no delay, no omission, high speed, few errors and low cost, realizes real-time digital behavior analysis of consumers, enables business analysis to be closer to reality, brings more valuable analysis results to brands, and guides the brands to optimize consumption paths globally.

It should be noted that the drawings in the description of the embodiments of the present disclosure are merely some embodiments of the present disclosure. For those of ordinary skill in the art, other drawings can be obtained without creative work based on these drawings.

The above embodiments are provided merely for better illustrating the present disclosure. The above embodiments do not describe all the details, and the present disclosure is not limited to only the above specific embodiments. Obviously, many modifications and variations can be made according to the content of the above description. This specification selects and specifically describes these embodiments in order to better explain principles and practical applications of the present disclosure, so that those skilled in the art could understand and implement the present disclosure well. The present disclosure is merely limited by the claims and their full scope and equivalents.

What is claimed is:

1. A big data acquisition and analysis system using intelligent image recognition, comprising an intelligent cloud server, wherein
    the intelligent cloud server comprises a computation server and a storage server that are interactively connected, the computation server is equipped with an image recognition system which comprises a data reading module, a video stream data processing module, an Artificial Intelligence (AI) image recognition module, a data storage module and a model tuning module that are sequentially connected, the storage server is provided with a video stream storage database, a video stream management module and a data center database that are interactively connected, and the data reading module is interactively connected with the video stream storage database;
    the intelligent cloud server is configured to receive, through a communication network and Hyper Text Transfer Protocol(s) (HTTP(s)), big data acquired by a video stream acquisition terminal and transmitted as video stream data, and store the big data in the video stream storage database, wherein the big data comprises pictures, live videos or common videos;
    the video stream storage database is configured to store the acquired video stream data, the data center database is configured to store device information on the video stream acquisition terminal, and match the acquired video stream data with the video stream acquisition terminal, and the video stream management module is configured to manage upload, deletion and a read order of the video stream data;
    the data reading module is configured to sequentially read arranged video stream data in the video stream storage database, the video stream data processing module is configured to filter and process the video stream data into image data capable of being recognized by the AI image recognition module, the AI image recognition module is configured to perform AI intelligent image recognition on the image data processed by the video stream data processing module, and compare the recognized image data with an image recognition classifier model stored in the data storage module to obtain a recognition result, and the model tuning module is configured to perform recognition model tuning on the AI image recognition module by continuing training classifier models and classification samples, in response to recall and correctness of the AI image recognition module.

2. The big data acquisition and analysis system according to claim 1, wherein the communication network comprises 4G, 5G or WIFI.

3. The big data acquisition and analysis system according to claim 1, wherein the video stream acquisition terminal is configured to record a digital behavior of a user's operation and form the video stream data, and comprises a computer, a smart phone, a tablet or a smart TV.

4. The big data acquisition and analysis system according to claim 1, wherein the data center database comprises a device video stream storage path data table, a user configuration data table and a device status data table;
    the device video stream storage path data table is configured to establish and allocate a storage path between the acquired video stream data and partitions of the video stream storage database;
    the user configuration data table is configured to obtain and store configuration parameter data information of a User Equipment (UE) that transmits the video stream data; and
    the device status data table is configured to obtain and store device status data information of the UE that transmits the video stream data, wherein the device status data information comprises running, interrupted and terminated.

5. The big data acquisition and analysis system according to claim 1, wherein the data storage module is provided with an advertising classifier model, a brand classifier model and a product classifier model.

6. An application method of the big data acquisition and analysis system according to claim 1, comprising:
    S01, acquiring video stream data, wherein the video stream acquisition terminal acquires the non-private secure video stream data generated by a user in a process of using the video stream acquisition terminal through screen recording;
    S02, transmitting and storing the video stream data, wherein the video stream data is transmitted to the video stream storage database in the intelligent cloud server for storage through the communication network, the video stream acquisition terminal and a corresponding storage path in the video stream storage database are matched, and configuration data and device status data of the video stream acquisition terminal are stored and recorded;
    S03, the intelligent cloud server reading data, wherein the video stream data sorted in the video stream storage database is read and transmitted by the data reading module to the video stream data processing module for processing;
    S04, the intelligent cloud server processing the video stream data read by the data reading module, wherein the processing comprises two following modes:
        disassembling key frames of the acquired video stream data frame by frame, performing differential analysis and comparison on continuous time sequence images obtained after the disassembly, selecting and stitching the key frames to be recognized, and transmitting the key frames to be recognized to the AI image recognition module for image recognition, or
        extracting unique physical features from the acquired video stream data, performing differential analysis and comparison on the unique physical features with a detection model in the storage server, selecting useful video stream data based on the differential analysis and comparison, disassembling key frames of the useful video stream data frame by frame, selecting and stitching the key frames to be recognized, and transmitting the key frames to be recognized to the AI image recognition module for image recognition, wherein the intelligent cloud server automatically allocates a processing mode based on a size of the acquired video data stream;

S05: performing AI recognition on the video stream data processed by the intelligent cloud server to obtain recognized image data, wherein distributed recognition is performed based on a pre-trained advertising classifier, brand classifier or product classifier; if the recognition succeeds, feeding back a corresponding parameter result and a corresponding type to the intelligent cloud server; or if the recognition fails, discarding the video stream data;

S06: classifying and storing the recognized image data, wherein the corresponding parameter result and the corresponding type are reclassified to obtain complete consumer behavior and contact data to be stored in the storage server; and S07: tuning the AI image recognition model, which comprises continuing adding samples and tests to tune the image recognition model in response to recall and accuracy of the AI image recognition module.

7. The application method according to claim 6, wherein the physical features in S04 comprise color features, video texture features or video motion features of the video stream data.

8. The application method according to claim 6, wherein the communication network comprises 4G, 5G or WIFI.

9. The application method according to claim 6, wherein the video stream acquisition terminal is configured to record a digital behavior of a user's operation and form the video stream data, and comprises a computer, a smart phone, a tablet or a smart TV.

10. The application method according to claim 6, wherein the data center database comprises a device video stream storage path data table, a user configuration data table and a device status data table;

the device video stream storage path data table is configured to establish and allocate a storage path between the acquired video stream data and partitions of the video stream storage database;

the user configuration data table is configured to obtain and store configuration parameter data information of a User Equipment (UE) that transmits the video stream data; and the device status data table is configured to obtain and store device status data information of the UE that transmits the video stream data, wherein the device status data information comprises running, interrupted and terminated.

11. The application method according to claim 6, wherein the data storage module is provided with an advertising classifier model, a brand classifier model and a product classifier model.

* * * * *